Dec. 1, 1931.  C. L. EKSERGIAN  1,834,486
REENFORCED VEHICLE WHEEL
Filed May 29, 1930
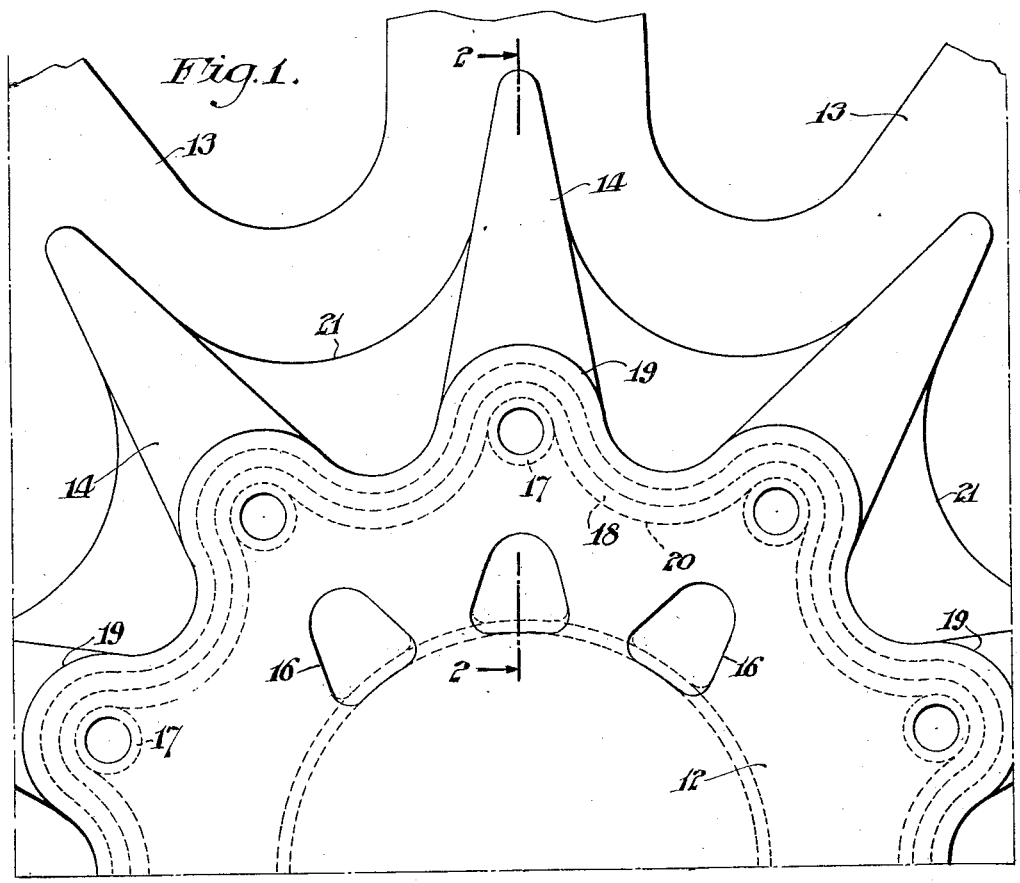
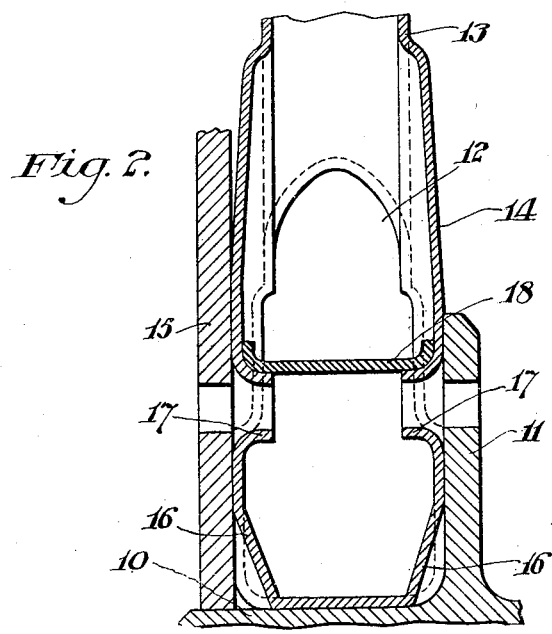
INVENTOR:
Carolus L. Eksergian,
BY
ATTORNEY Patented Dec. 1, 1931

1,834,486

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

REENFORCED VEHICLE WHEEL

Application filed May 29, 1930. Serial No. 457,094.

My invention relates to the art of wheels, and it has been my purpose to improve the artillery steel wheels of the prior art by strengthening the center portion thereof in the region of the bolt holes. Experience has shown that this is the part of a steel wheel of the artillery type which is most likely to fail in service. I have therefore sought to reenforce the wheel at this point in order to establish a strengthened zone to resist the unusual stresses caused by the driving studs.

Although I have illustrated my invention in connection with a wheel of the non-demountable type, it might also be used in connection with a demountable wheel. Certain aspects of my invention are not limited to artillery wheels in their applicability, and I do not, therefore, wish to be altogether limited to this art.

In the drawings,

Fig. 1 is a side elevation of my improved wheel, and

Fig. 2 is a sectional view along the line 2—2 of Fig. 1.

Referring to the drawings by reference characters, 10 denotes a vehicle hub having a flange 11 to which the wheel is secured. The wheel proper preferably consists of a nave portion 12 and spoke portions 13 integrally joined together. In the manufacture of such a wheel the parts are formed in two axially divided duplicate stampings, each comprising a nave portion and spoke portions, which are thereafter integrally joined together to form the complete wheel. The wheel is formed with a series of approximately triangular outwardly extending ribs 14 extending substantially radially from a base portion surrounding the bolt holes a considerable distance outwardly to their apices which lie within the spokes proper. The portion between the ribs is radially stepped as indicated at 21. These ribs are connected at their bases, thereby forming a continuous annular rib. The backing plate 15 abuts the rear face of the wheel. This backing plate may be the head of a brake drum or not, according to the design of the wheel, and it is secured to the wheel by the same means, (not shown), which secure the wheel to the hub. A flanged ring 18 extends annularly about the bolts in the wheel which receive the securing means, and is nested snugly within inturned flanges 17 in the nave 14 of the wheel. This ring is preferably of undulating configuration. Portions 19 thereof surround the bolt holes and extend outwardly within the ribs of the triangular rib portions of the wheel, while other portions 20 are guided by the innermost portions of these ribs and thereby held inwardly within and beyond the circle formed by the securing means. The ring is thereby held accurately in its radial position within the wheel by the ribs and the flanges of the bolt holes, and it is accurately held axially by reason of its close nesting within the flanges 17 and the sides of the nave portion of the wheel. The wheel is additionally inwardly ribbed at 16, to provide additional stiffening means adjacent its bearing seat on the base of the hub at this point.

In the manufacture of my improved wheel, the ring 18 will first be assembled with one of the halves of the wheel and the other half then welded thereto. In case the parts are welded by the use of electricity, insulation should, of course, be provided between the flanges of the ring and the parts of the wheel proper.

It will be obvious that my wheel has many advantages over those of the prior art. In the first place, the two series of ribs extend throughout substantially the entire radial length of the nave portion of my wheel and thereby tend to stiffen it at its most vulnerable point. Secondly, the undulating ring 19 which is, in turn, flanged, reenforces the wheel still further and is so located as to extend inwardly toward the center of the wheel between the aforementioned rib portions 14 and 16, and to extend outwardly into the rib portions 14. This structure insures a very considerable reinforcing effect in the direct neighborhood of the bolt hole.

Modifications will be obvious to those skilled in the art, and I do not, therefore, wish to be limited except by the terms of the sub-joined claim.

What I claim is:

An artillery steel wheel comprising integral spoke and nave portions, ribs formed in the nave portion and extending into the spoke portions, a series of flanged openings in the opposite faces of said wheel adapted to receive securing means, and an annular reenforcing ring of undulating form positioned by said ribs and the flanges of said openings.

In testimony whereof I hereunto affix my signature.

CAROLUS L. EKSERGIAN.